No. 799,374. PATENTED SEPT. 12, 1905.
C. H. GRAY & T. SLOPER.
RUBBER FABRIC.
APPLICATION FILED OCT. 5, 1903.

5 SHEETS—SHEET 1.

Witnesses
E. Harriner
[signature]

Inventors
Christian Hamilton Gray
Thomas Sloper
By [signature]
Attorneys

No. 799,374. PATENTED SEPT. 12, 1905.
C. H. GRAY & T. SLOPER.
RUBBER FABRIC.
APPLICATION FILED OCT. 5, 1903.
5 SHEETS—SHEET 2.
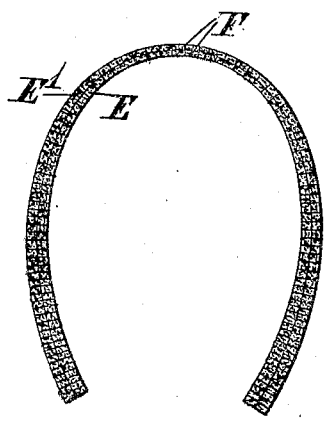
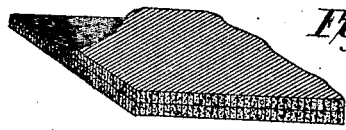

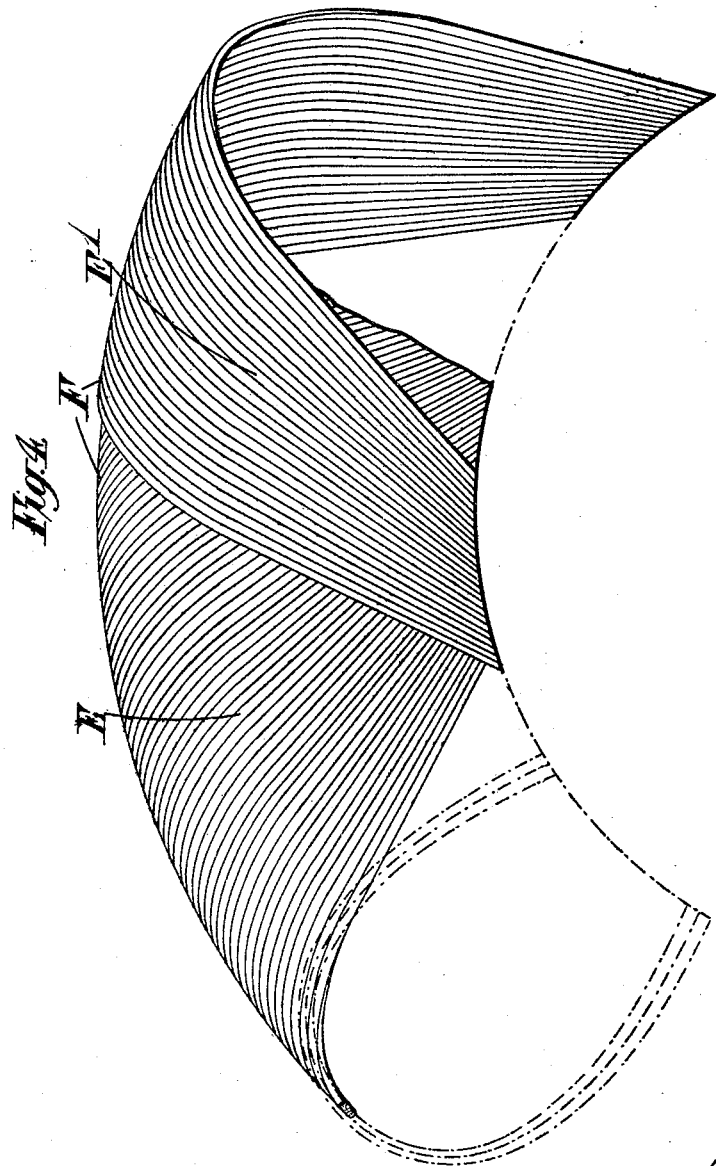

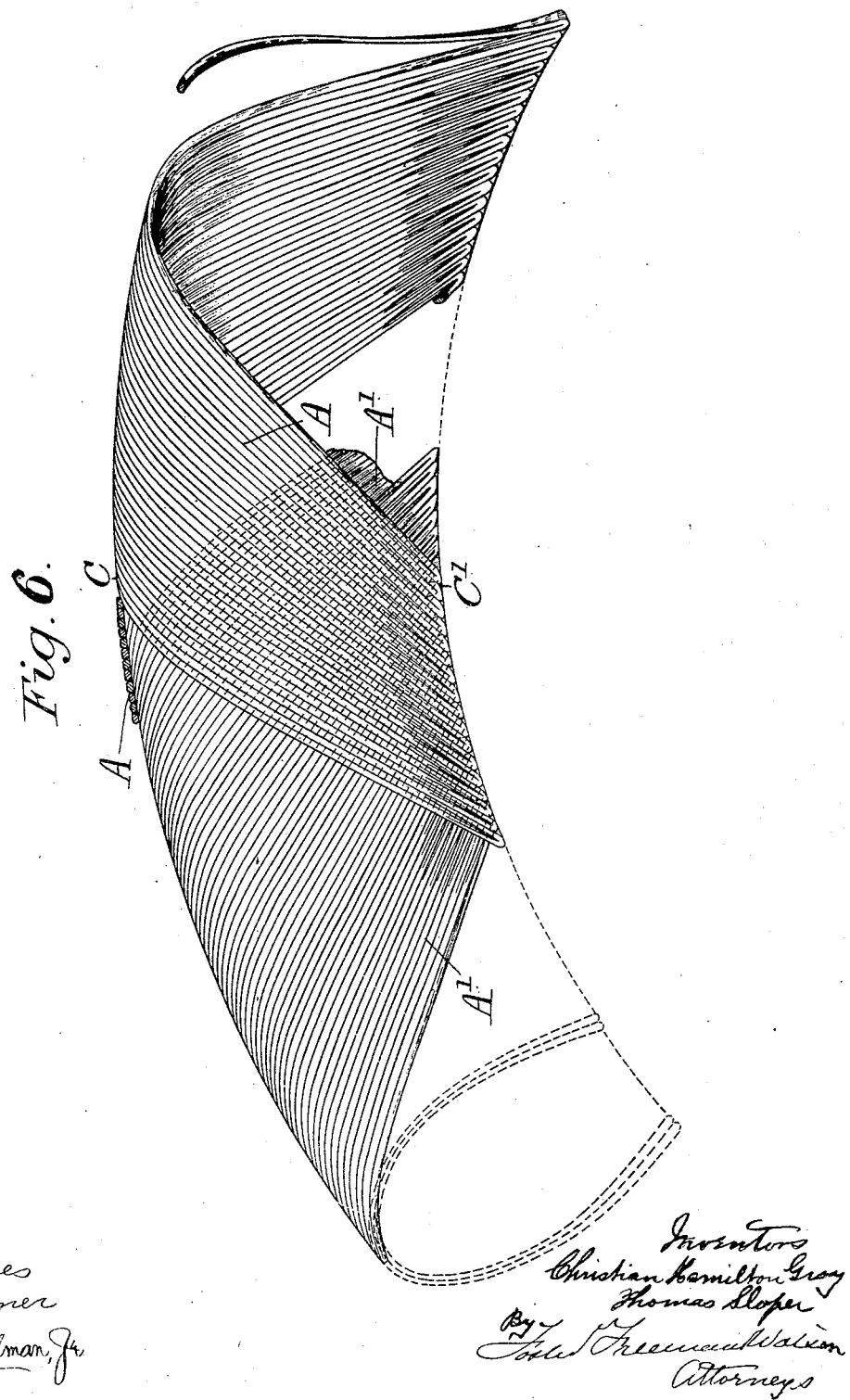

No. 799,374. PATENTED SEPT. 12, 1905.
C. H. GRAY & T. SLOPER.
RUBBER FABRIC.
APPLICATION FILED OCT. 5, 1903.
5 SHEETS—SHEET 5.
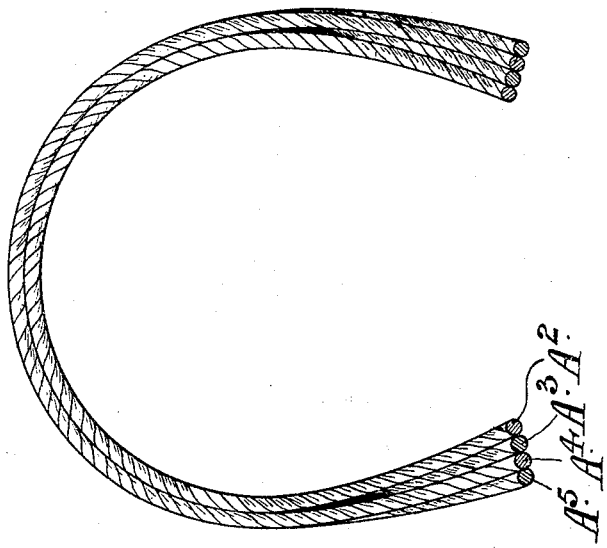
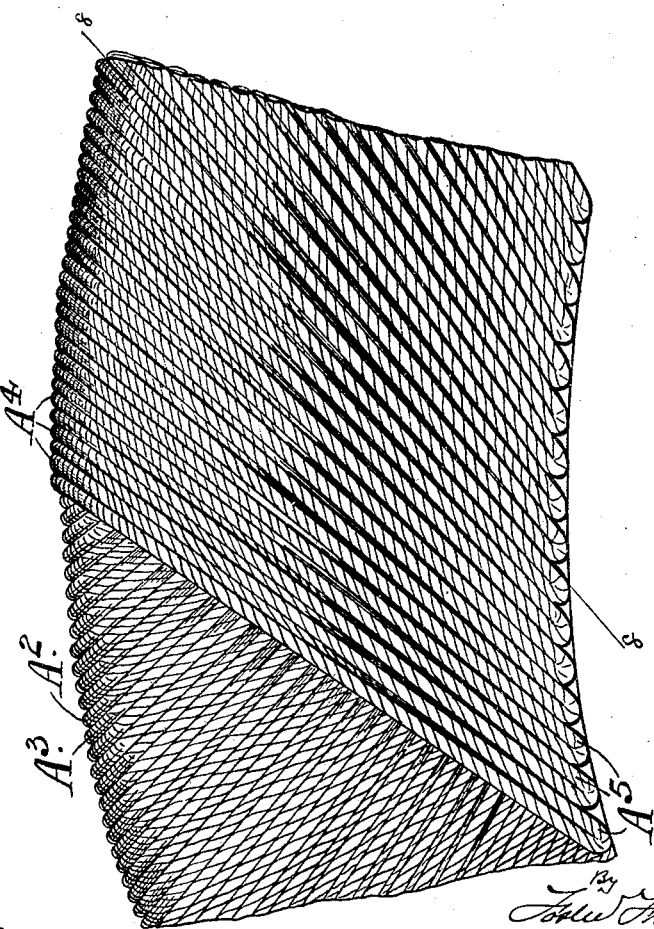

UNITED STATES PATENT OFFICE.

CHRISTIAN HAMILTON GRAY, OF SILVERTOWN, AND THOMAS SLOPER, OF DEVIZES, ENGLAND; SAID SLOPER ASSIGNOR TO SAID GRAY.

RUBBER FABRIC.

No. 799,374.      Specification of Letters Patent.      Patented Sept. 12, 1905.

Application filed October 5, 1903. Serial No. 175,881.

*To all whom it may concern:*

Be it known that we, CHRISTIAN HAMILTON GRAY, residing at Silvertown, county of Essex, and THOMAS SLOPER, residing at Devizes, county of Wilts, England, subjects of the King of England, have invented a new and useful Rubber Fabric, of which the following is a specification.

The object of this invention is to provide an improved rubber fabric of greater strength than those heretofore manufactured.

The fabric is adapted for various purposes, and one of the main features of the invention is that it is composed of parallel cords connected together by or embedded in rubber and so shaped that they lie more closely together than those of fabrics manufactured in this manner heretofore, so that a greater number of cords may be embedded in any given piece of fabric, resulting in the production of a stronger material. In addition to the particular shaping of the cords employed each cord is built up of a number of threads twisted together, and this composing each cord of threads twisted together and also shaping the cord so formed in the manner hereinafter described results in a novel behavior of the fabric under certain conditions.

A further part of this invention refers to so shaping or treating parts of the specially-shaped cords composing the fabric that the same cord will present a wider face parallel to the plane of the fabric at one part than at another.

Figure 1:
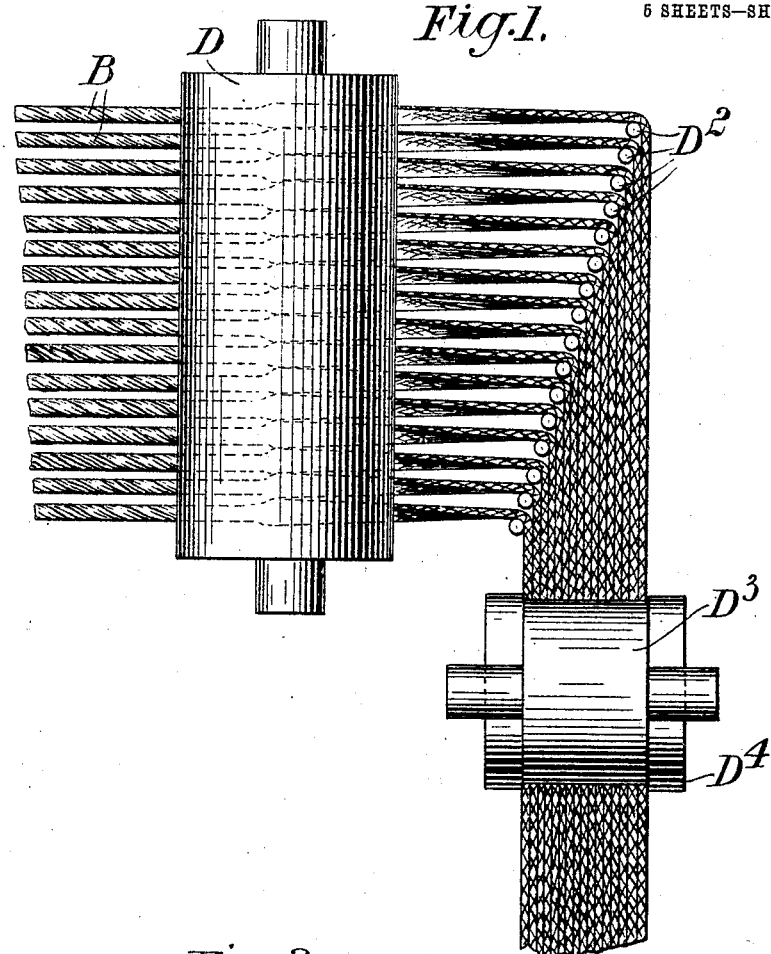
Figure 2:
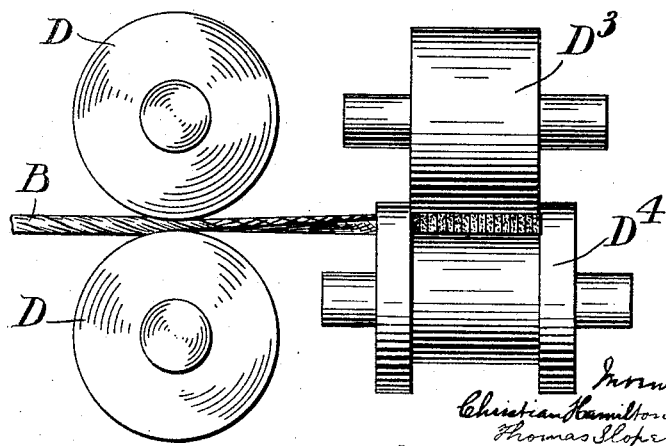

In the accompanying drawings, which illustrate a fabric manufactured according to this invention and one method of manufacturing the fabric, Figure 1 is a diagrammatic view in plan illustrating the method of manufacturing the fabric. Fig. 2 is an elevation of the same from the end at which the fabric is delivered. Fig. 3 is a perspective view of two layers of the fabric placed one upon the other, the threads in one layer being at approximately right angles to those in the other layer. Fig. 4 is a side elevation of the double fabric as shown in Fig. 3 treated as hereinafter described. Fig. 5 is an end view of the same. Fig. 6 is an elevation of the fabric built up in a slightly-different manner. Fig. 7 is a side elevation of a piece of fabric similar to that shown in Fig. 6, but produced by different means; and Fig. 8 is a transverse section through the fabric shown in Fig. 7 on the line 8 8, the cut cord having been removed.

A convenient method of composing the fabric according to this invention consists in passing a series of round cords B, each composed of a number of threads twisted together and rubbered in any known manner, between rollers D. The cords are passed through the rollers D and the rest of the process hereinafter described carried out while the rubber with which they are coated and impregnated according to known methods is in an unvulcanized condition. Each cord after passing between the rollers in place of its former circular cross-section has an elongated cross-section, that shown in the figure referred to being oblong. For the purpose of this invention, however, the cords may be of any cross-section, provided they are flattened and have two opposite faces wider than the remaining two opposite faces. For instance, they may be of oval cross-section in the place of oblong or practically oblong, but the narrower faces or ends of the cross-section rounded, as shown at A, Fig. 6. The cords B leave the rollers with their wider faces toward the latter and their narrower faces toward each other. To bring them, therefore, into the position in which they are required to lie in the fabric, they are carried round pins $D^2$ and made to travel off from the pins at an angle to their former course, so that they bear against the pins and are turned with their wider faces toward each other. In this position the cords are passed between rollers $D^3$ $D^4$, which bear upon the cords, driving them together, so that they adhere, by means of the rubber with which they are coated, to one another. The roller $D^4$ is provided with end flanges to prevent the fabric from spreading laterally under the applied pressure. It will thus be seen that by this means a fabric is produced composed of a number of parallel cords each of elongated cross-section, with their wider faces contiguous, as clearly shown in Fig. 3, and connected together by rubber. As stated above, the fabric is treated in this way before the rubber is vulcanized, and after the cords are brought together any desired thickness of rubber may be placed on both sides of the fabric, so that the cords are finally embedded in rubber as well as being connected together by it, and the whole may be vulcanized into a solid mass. The great advantage of a fabric manufactured in this manner is that it is more or less plastic in one direction, so that parts of it may be expanded by rolling or other means, resulting in a vertical compression and a lateral expansion of the cords at these parts, each cord thus flattened presenting a wider face parallel with the plane of the fabric at one part than at another. This is of great advantage in applying the fabric for the purpose of manufacturing covers for pneumatic tires or for articles of irregular shape.

In Figs. 4 and 5 a portion of a tire-cover in process of manufacture is shown built up of two layers of cord fabric E E', the cords of each layer being of the cross-section and laid together in the same manner as just described with reference to Figs. 1, 2, and 3. The cords of the layer E are arranged to cross the tire diagonally from edge to edge, and the cords E' of the other layer are arranged in a similar manner, but in the opposite direction, so that one layer of cords lies approximately at right angles to the other. After the cord fabric composed of two layers has been made in a flat form, as shown in Fig. 3, the fabric is rolled or pressed at the center or tread portion by any convenient means, so that that part of each cord which lies at the tread is made to expand in the direction of the circumference of the wheel, as shown at F, Figs. 4 and 5, and presents a wider face parallel with the plane of the fabric at this point than the same cord does at the edge of the tire. If an article such as a pneumatic-tire cover is built up of ordinary cords crossing from the rim on one side over the tread to the rim on the other side, it is found that when the cords are placed close together at the rim there are spaces between them at the tread part owing to the larger circumference at the latter position. By this invention the cords are placed closer together at the rim part of the cover than is possible when cords of ordinary construction are employed, and the formation of spaces between the cords is prevented at the tread portion of the tire. When the cords have thus been treated at the tread portion, the fabric may be covered with any desired thickness of rubber or other materials, and a strong cover is thus produced composed of parallel cords which lie close to each other throughout the whole of the tire.

It will be understood that to obtain the result described above the fabric should be rolled most at that part which is to form the center of the tread and the rolling gradually decreased toward the edge, so that each cord gradually widens from the edge to the tread, as shown in the drawings, the fabric becoming thinner where it is rolled.

Fig. 6 shows another method of building up the fabric and producing the desired result without rolling. In this case a cord A' of elongated cross-section, as before, is employed and carried backward and forward from edge to edge of the tire. This forms one layer of cords crossing the tread obliquely in one direction, and a second layer A is applied in the same manner crossing the tread obliquely in the opposite direction; but as each cord is laid across the tread portion C of the tire it is turned so that its wider faces lie parallel with the plane of the fabric. It will be seen from this that the fabric is composed of cords which gradually widen toward the tread portion of the cover, so that each cord is in contact with its neighbor throughout its length, with no spaces between them requiring to be filled with rubber or other material.

Another method of producing a flattened cord or a cord of elongated cross-section for the purpose of producing a tire-cover such as described with reference to Figs. 4 to 6 is shown in Figs. 7 and 8. In this case two cords of circular cross-section are fastened together conveniently by rubber, so that they form a single cord having two wide parallel faces opposite each other and two corresponding narrower faces. Each cord of the outer layer (corresponding to the cord A of Fig. 6,) is composed of two cords $A^4 A^5$, each circular in cross-section but so united that the composite cord formed thereby is of substantially the same cross-sectional form as the corresponding one-piece cord A of Fig. 6, and each cord of the inner layer (corresponding to the cord A' of Fig. 6) is composed of two cords $A^2 A^3$, similar in form and arrangement to those designated $A^4 A^5$, above referred to. This double cord is then treated in the same manner as the single cord (illustrated in Fig. 6) and produces the same result—that is, the double or composite cord of the outer layer, for example, is so arranged that at the edge of the fabric its two members $A^4 A^5$ are superimposed, or the lesser diameter of the composite cord extends parallel with the plane of the fabric. In other words, only the member $A^5$ of such composite cord is visible at the edge of the cover; but as the cord is advanced toward the tread it is turned in the same manner as the cord A of the fabric disclosed by Fig. 6 and the member $A^4$ thereof is gradually brought to the surface from beneath the member $A^5$ until both said members $A^4$ and $A^5$ lie in the same plane, as is clearly shown at the top of Fig. 7, or, in other words, at the tread the greater diameter of the composite cord is parallel with the plane of the fabric. The fabric thus composed of parallel cords of elongated cross-section laid side by side with their wider faces contiguous with or without turning the cords or otherwise treating them to bring their wider faces parallel with the plane of the fabric at particular portions of the fabric may be used for various purposes.

For the manufacture of hose-pipes, which is another use to which this fabric can be applied, the cords are not turned, but remain with their wider faces contiguous throughout and are wound spirally, so that they form a tube, two layers of cords only preferably being employed and any suitable thickness of rubber. By using this material in this manner for hose-pipes it is found that a hose-pipe may be constructed to withstand very high pressures, as when pressure is brought to bear upon the pipe the cords are compressed, and owing to their being each composed of a number of twisted threads they tend to become circular. This results in each cord being pressed against its neighbor with a force increasing according to the pressure exerted upon the wall of the pipe, so that the contents of the pipe are prevented from being forced between the separate threads. For using the material in this manner it is advisable that the cords should be composed of a number of threads twisted together; but for tire construction this is not essential, although it is preferred.

It will be understood that one of the objects of this invention is to produce a fabric having a greater number of reinforcing-threads per unit of area than is possible when ordinary threads are employed. For such articles as hose-pipes, pneumatic tires, and the like it is desired to obtain the greatest possible strength with the minimum number of layers of material. In fabric composed of a layer of ordinary threads secured together by india-rubber the number of threads per inch in the fabric is generally rather less than the number of thicknesses of fabric to the inch. By means of our invention we are able to produce a fabric in which the number of threads per inch considerably exceeds the number of thicknesses of fabric per inch, and we are consequently able to produce articles—such as hose-pipes, pneumatic tires, and the like—composed of two layers of fabric only which equal or exceed in strength articles made with three, four, or more layers of ordinary fabric, and in addition to this great increase in strength our article is more flexible and more durable.

Obviously the material may be produced by means other than that shown in Figs. 1 and 2, although this is described as one convenient process of manufacture.

What we claim as our invention, and desire to secure by Letters Patent, is—

1. A new article of manufacture consisting in a tire fabric composed of approximately parallel cords crossing the tread from the edge of the tire and so arranged that the longer circumferential outline at the tread formed by the curve is completely filled by the cords which lie substantially as close together at that line as they do at the smaller circumferential outline at the edges of the cover, substantially as set forth.

2. As an article of manufacture, a tire fabric having the form of a tire and comprising a series of suitably-connected cords extending transversely of the fabric and arranged to contact at the tread of the tire.

3. As an article of manufacture, a tire fabric comprising a series of suitably-connected cords extending transversely of the fabric and arranged as close together at the tread of the tire as at the edges thereof, said cords being so arranged or disposed that the circumference of the fabric at the edges of the tire is shorter than the circumference of the fabric at the tread of the tire.

4. As an article of manufacture, a tire fabric comprising a series of suitably-connected cords extending transversely of the fabric and arranged as close together on the tread of the tire as at the edges thereof and so arranged or disposed as to form a substantially continuous surface having its opposite side edges of less length than the length of the intermediate portions of the fabric which forms the tread of the tire.

5. As an article of manufacture a tire fabric comprising a series of substantially parallel cords completely covering the tire-surface and connected by rubber and so arranged or disposed that the circumference of the fabric at the edges of the tire is shorter than the circumference of the fabric at the tread of the tire.

6. A new article of manufacture consisting in a rubber fabric for tires having parallel cords of elongated cross-section crossing the tread from the edge, the width parallel with the plane of the fabric in each cord being greater at the tread than at the edge of the tire and means for connecting the cords together, substantially as set forth.

7. A new article of manufacture consisting in a tire fabric composed of parallel cords having a diameter in one direction greater than that in a direction at right angles to it, the cords crossing the tread from the edge of the tire and lying with their lesser diameters parallel with the plane of the fabric at the edge but turned to bring their greater diameters parallel with the plane of the fabric at the tread, and means for connecting the cords together, substantially as set forth.

8. A new article of manufacture consisting in a tire fabric having approximately parallel cords each composed of a plurality of cords fastened together side by side to constitute a single cord of greater width in one direction than the other, such cords crossing the tread from the edge of the tire and lying with their sides of lesser width parallel with the plane of the fabric at the edges but turned to bring their sides of greater width parallel with the plane of the fabric at the tread, substantially as set forth.

9. A process of manufacture of a rubber fabric consisting in subjecting a plurality of unvulcanized rubbered cords to pressure to flatten them and give them an elongated cross-section, bringing the cords together with their wider faces in contact and then subjecting the cords to pressure to unite them, substantially as set forth.

10. A process of manufacture of a rubber fabric consisting in applying pressure to a plurality of unvulcanized rubbered cords to flatten them and give them an elongated cross-section, bringing the cords together with their wider faces in contact so that they form a flat band, subjecting said band to pressure to unite the cords, and separately applying pressure to part of the fabric to increase its area, substantially as set forth.

11. A process of manufacture of a rubber fabric consisting in applying pressure to a plurality of unvulcanized rubbered cords to flatten them and give them an elongated cross-section, bringing the cords together with their wider faces toward each other, and applying pressure to the cords while in such position to unite them, substantially as set forth.

12. A process of manufacture of a rubber fabric consisting in applying pressure to a plurality of unvulcanized rubbered cords to flatten them and give them an elongated cross-section, bringing the cords together with their wider faces toward each other so that they form a flat band, subjecting said band to pressure to unite the cords and separately applying pressure to a part of the fabric to increase its area, substantially as set forth.

13. A new article of manufacture consisting of a fabric composed of twisted rubbered cords, flattened and arranged in contact with their longer transverse axes at right angles to the plane of the fabric and capable of lateral expansion by the local application of pressure substantially as set forth.

In testimony whereof we have signed our names to this specification in the presence of two subscribing witnesses.

CHRISTIAN HAMILTON GRAY.
THOMAS SLOPER.

Witnesses to the signature of Christian Hamilton Gray:
T. J. OSMAN,
W. J. NORWOOD.

Witnesses to the signature of Thomas Sloper:
WILLIAM H. BALLANTYNE,
A. M. HAYWARD.